July 25, 1961  W. L. MARSHALL  2,993,820
INSULATED CONDUCTOR AND METHOD OF MAKING SAME
Filed April 9, 1956
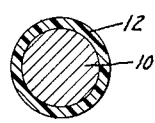
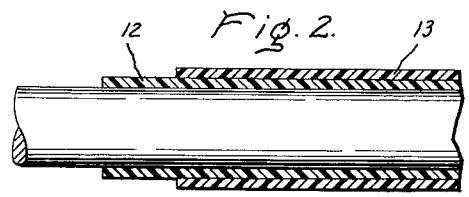
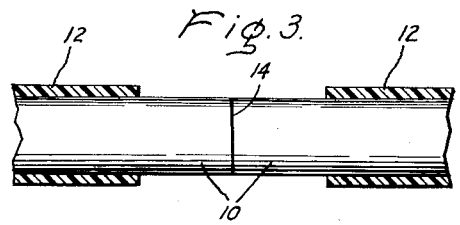
Inventor:
Walter L. Marshall,
by Vernon F. Kalb
His Attorney.

United States Patent Office 2,993,820
Patented July 25, 1961

2,993,820
INSULATED CONDUCTOR AND METHOD OF MAKING SAME
Walter L. Marshall, Schenectady, N.Y., assignor to General Electric Company, a corporation of New York
Filed Apr. 9, 1956, Ser. No. 577,024
6 Claims. (Cl. 154—2.27)

The invention described herein relates to the encapsulation of articles and more particularly to an improved conductor and method for insulating same. The primary object of the invention is to provide a process for post-orienting polyethylene terephthalate and thereafter applying it to a coated object for obtaining the application of a uniform pressure on the coated material or in molding an object to a predetermined configuration.

The prior art discloses the basic concept of obtaining a tight fitting layer of material on an article, such as an insulating layer on an electrical conductor, and in obtaining a slight contracting force on an underlayer of material previously applied thereto. For example, a well known process employed in obtaining a compressive force by an overtaping of material, is to soak cotton tape in water, apply it to the coated article and during drying, the cotton fibers shrink and contract to exert a small force on the coating material. The use of leather in lieu of cotton for this purpose is often resorted to because of its greater strength of recovery i.e., force created upon shrinking, when moisture is removed from the wrapping. Still another method employed in waterproofing ducts and the like, while still obtaining the equivalent of shrinkage, is to stretch rubber tape while applying it to the duct, and upon curing of the tape, the rubber forms a firm waterproof bond with the duct while simultaneously obtaining the benefits of a compressive force resulting from the stretch-taping operation. Recent developments in the chemical field have resulted in the production of materials which will shrink slightly upon heating and the use of these materials for the purposes described above has been suggested. For example, irradiated polyethylene exhibits shrinking properties, as disclosed in the copending application of Paul A. Goodwin and John R. Stirrat, Serial No. 518,403, filed June 27, 1955, and assigned to the same assignee as this invention. The use of irradiated polyethylene for insulating dynamoelectric machine coils is also known, as disclosed and claimed in copending application of Harold Kitson, Jr., Walter L. Marshall and Henry E. Mazanek, Serial No. 568,615, filed February 29, 1956, and also assigned to the same assignee as the present invention, but this material does not contain a force of recovery approaching that of polyethylene terephthalate described herein and therefore cannot be effectively used to carry out the above described objects.

However, the above-mentioned processes, with the exception of those cited in the copending applications, utilized in encapsulating articles, have certain drawbacks in that they cannot provide fluid tight structures without unduly increasing the weight of the final product. Moreover, it is not possible by practicing these processes, to obtain the application of a compressive force on the coating material or on the article itself to any great degree because the outer tapings do not have a very large recovery force, that is, the force created by shrinkage upon curing of the material is not great. Furthermore, they are expensive.

A thermoplastic film which can be obtained much more reasonably in cost than current coatings and which has superior qualities is polyethylene terephthalate. This material, which is sold under the name of Mylar by E. I. du Pont de Nemours and Company, Wilmington, Delaware, has exceptional strength and a relatively high point of flow although it is a thermoplastic material. The polyethylene terephthalate usually obtained commercially is in fiber or sheet form, and for many applications, is available in thin films in the order of from about 0.1 to 20 mils in thickness. In addition, the film is in an oriented, that is, a stretched condition, which orientation may take place by stretching the film at room temperature or at higher temperatures but below the fusion point of the polymer.

This material is a very highly oriented film made by drawing the film biaxially as it comes from the melt. The final stretched film is held in the stretched configuration while the molecular orientation is "heat-set" at a temperature near 220° C. This heat setting reduces the thermal shrinkage so that the full recovery of draw will not take place. After cooling, measurement of the tensile recovery force when the polyethylene terephthalate is heated through the temperature range of 25° C.–150° C., reveals that there is a low order of recovery. In fact, the tensile recovery force decreases with increase in temperature so that the recovery force averages approximately 700–750 p.s.i. through the temperature range of 25° C.–150° C.

Unexpectedly however, I have found that if this oriented polyethylene terephthalate as obtained commercially, is additionally uni-axially stretched or "post-oriented" in the range of 3% to 24%, at room or elevated temperatures, and thereafter heated in the range of 25° C. to 150° C. for one-half to one hour, there will be recovery of substantially all of this post-oriented elongation. If the material is restrained in the stressed or stretched condition at this temperature, i.e., 25° C.–150° C., it exerts a very strong restoring force.

In carrying out my invention, I utilize the newly discovered characteristics of polyethylene terephthalate when it is applied as an outer tape on a layer of insulating material previously provided on a conductor. Upon heating, the post-oriented polyethylene terephthalate creates a recovery force sufficient to compress the insulating layers against one another and the conductor while simultaneously forming a firm bond therebetween. The post-oriented polyethylene terephthalate preferably is a sacrifice taping and after the conductor cools, it is removed.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawings in which:

FIGURE 1 is an end view of a conductor provided with an outer layer of insulating material;

FIGURE 2 is a side view of a conductor showing a layer of insulation and an outer layer of polyethylene terephthalate used in applying a compressive force to the insulation; and FIGURE 3 is a side view of a pair of brazed conductors showing insulation terminating short of the brazing point.

Referring now to the drawings wherein like reference characters designate like or corresponding parts throughout the several views, there is shown in FIGURES 1 and 2 a conductor or lead 10 provided with insulating material 12. After application of the insulating material 12, an outer layer of post-oriented polyethylene terephthalate 13 is applied over the insulating material and heated at a temperature hereinafter described to effect the application of a compressive force on the insulating material positioned thereunder.

As mentioned above, polyethylene terephthalate uni-axially drawn or post-oriented at certain temperatures and elongations show a great recovery force when subsequently heated. When the draw temperature is increased, independent of the other variables used, the temperature necessary for maximum recovery force increases and is accomplished by a corresponding increase in recovery force. The following test results illustrate maximum tensile recovery force versus temperature on samples of polyethylene terephthalate material having original length and width dimensions of 1.00" x .001":

| Draw Temp., °C. | Draw Speed, inches/sec. | Percent Elongation | Shrink Temp., °C. | Recovery Force (Max.), p.s.i. |
|---|---|---|---|---|
| 25 | 1.05 | 12 | 89 | 2,500 |
| 25 | 1.8 | 12 | 90 | 2,450 |
| 25 | 1.05 | 24 | 87 | 3,000 |
| 95 | 1.8 | 12 | 90 | 4,800 |
| 95 | 1.05 | 24 | 90 | 4,100 |
| 95 | 1.8 | 24 | 90 | 4,600 |
| 130 | 1.8 | 12 | 110 | 2,800 |
| 130 | 1.05 | 12 | 110 | 3,800 |
| 130 | 1.8 | 24 | 112 | 5,400 |
| 130 | 1.05 | 24 | 110 | 3,150 |

In view of the large force of recovery inherent in "post-oriented" polyethylene terephthalate, it is evident that it has unlimited application in many different fields and for varied uses. In order that those skilled in the art may better understand how the present invention may be practiced, the following examples are given by way of illustration and not by way of limitation.

Example 1

A first layer of insulating material consisting of 1" by 5 mil thick tape of irradiated polyethylene of the type disclosed by Elliott J. Lawton and Arthur M. Bueche in copending application Serial No. 324,552, filed December 6, 1952, and assigned to the same assignee as this invention, was applied to a 300 mil solid copper bar approximately 18" in length. This was followed by a second wrap of the same material wound in the opposite direction to provide a build-up of 30 mils on the bar. Two wraps of polyethylene terephthalate, post-oriented approximately 24% and of one mil thickness, was applied over the irradiated polyethylene with a ⅓ to ½ overlay and the resulting structure heated through the temperature range of 25° C. to 150° C. for about ½ to 1 hour. The maximum compressive force applied to the irradiated polyethylene was 70 p.s.i. normal to the conductor. Upon cooling of the bar, the polyethylene terephthalate was removed. Examination after curing revealed that there were no air pockets or depressions in the irradiated polyethylene and it provided a very smooth, well-sealed surface.

Many different methods were followed in wrapping the bar and the example cited above produced the best results. It was found that a consistent overlay should be used in winding the irradiated polyethylene. The overlay preferably consists of two wraps of one mil post-oriented polyethylene terephthalate and that both materials should be wrapped as evenly as possible.

Example 2

A cable lead for a dynamoelectric machine of the type disclosed in the above-cited Harold Kitson, Jr., et al. copending application, was insulated by carrying out the following steps:

(1) The cable was thoroughly cleaned to remove grease and other foreign substances deposited on the wire.

(2) The entire length of the cable was taped with various materials in the following manner:

(a) One half lap layer of .001" commercial polyethylene terephthalate film;
(b) One half lap layer of .008" irradiated polyethylene;
(c) One half lap layer of .005" dicumyl peroxide catalyzed polyethylene;
(d) One half lap layer of .008" irradiated polyethylene; followed by
(e) Two half lap layers of post-oriented polyethylene terephthalate having the properties described above.

(3) The cable with its several layers of insulation was subjected to 135° C. temperature for one hour in order to obtain fusing of the insulation materials and to effect shrinkage of the post-oriented polyethylene terephthalate.

(4) The post-oriented polyethylene terephthalate was then removed from the cable.

The post-oriented polyethylene terephthalate exerted an unusually large compressive force on the various layers of insulation to squeeze out air bubbles appearing between the layers and compressed the insulation materials tightly against each other and the cable. A further function served by the outer layers of polyethylene terephthalate was that of providing a casing on the cable so that during curing, the insulation, because of its self-sealing properties, formed a smooth laminated coating impervious to high pressure liquids, effective in resisting attack by chemical substances and displayed high dielectric properties.

The cable insulated by the above-described process was submerged in water under a pressure of 2500 p.s.i. at 80° C. for three weeks and the resistance values dropped to a value no lower than $10^6$ megohms. Subsequent to this test, the motor disclosed in the aforemention Kitson et al. application having leads insulated in the manner disclosed herein, has operated for more than seven months under conditions equivalent to the test without failure. Prior to using the above-described method of insulating a cable, there were no known effective means of insulating leads or cables after they were insulated and installed in the machine and their ends brazed together. The condition of the leads subsequent to brazing was similar to that shown in FIGURE 3 in which the insulation 12 terminated short of the point where the leads were brazed together, as indicated at 14. Commonly employed vacuum-pressure processes heretofore employed were of no value because the leads were not accessible. However, subsequent to the discovery of the process disclosed herein, solution of the problem of sealing such leads was readily apparent. For example, in obtaining the waterproof covering on the brazed leads as shown in FIGURE 3, insulating materials 12 were applied over the leads 10 by following the process described above to arrive at a well-sealed laminated structure.

Example 3

An 18" solid copper bar having width and thickness dimensions set out in the table below, was wrapped with a heat hardenable resin impregnated mica-paper mat tape with an overlay of 1 mil post-oriented polyethylene terephthalate. Subsequent to heating and curing, dielectric tests were made on the finished product to determine the effectiveness in using polyethylene terephthalate.

| Sample | Mica Mat Tape Width, inches | Bar Dim., inches | Layers (½ Lapped) | Build | | Breakdown, kv. | V./Mil | |
|---|---|---|---|---|---|---|---|---|
| | | | | Flat | Edge | | Flat | Edge |
| 1 | 1¼ | ½ x 1⅛ | 4 | .110 | .080 | 26.0 | 234 | 325 |
| 2 | 1¼ | ½ x 1⅛ | 4 | .118 | .076 | 35.0 | 207 | 461 |
| 3 | ¾ | ¼ x 1¼ | 2 | .050 | .030 | 11.7 | 234 | 390 |
| 4 | 1¼ | ¼ x 1¼ | 2 | .066 | .039 | 18.7 | 280 | 479 |
| 5 | 1¼ | ¼ x 1¼ | 2 | .066 | .039 | 15.8 | 240 | 405 |

Since the force of recovery is so great when the post-oriented polyethylene terephthalate is heated to effect shrinkage, care must be taken to assure that there are no indentations or depressions in the object covered because the post-oriented polyethylene terephthalate, upon shrinking, will cause the underlayer of material to gather in the depressions and thereby adversely affect its insulation qualities. In the event flat conductors are used, semi-elliptical members may be placed on the flat sides of the conductor between the insulating material and the polyethylene terephthalate so as to obtain a uniform application of force to the material.

In view of the above, it is apparent that the treatment of an insulated conductor by utilizing the recovery force inherent in post-oriented polyethylene terephthalate imparts desirable qualities to insulated materials which they do not possess when used alone. In another example, a build of 48 mils of mica-mat epoxy resin was applied to a conductor followed by an overlay of 3 layers of half-lapped polyethylene terephthalate. This sample was then molded at 155° C. and held at 15 kv. for one minute with breakdown finally occurring at 19 kv. The same conductor, coated with two layers of the same base coating to provide a build of 100 mils, without the use of an overlay of polyethylene terephthalate, was subjected to dielectric test and breakdown occurred at less than 7.5 kv. In comparing this with the results obtained in the samples cited above, it is evident that the application of polyethylene terephthalate aids in producing a conductor having properties non-existent in the prior art.

Obviously many modifications and variations of this invention are possible in light of the above teachings. For example, it is known that the improved polyethylene terephthalate is particularly adaptable for use in molding thermosetting resinous materials to desired shapes and the invention is especially useful in fields where a combination of pressure and temperature, within the effective temperature range of the polyethylene terephthalate, are necessary in molding operations. It is to be understood that within the scope of the appended claims, the invention may be practiced otherwise than as specifically described.

What I claim as new and desire to secure by Letters Patent of the United States is:

1. The process of insulating an electrical conductor comprising applying a first wrap of heat hardenable resin impregnated mica-paper mat tape to a bar of electrically conductive material, wrapping an overlay of post-oriented polyethylene terephthalate on said mica-paper mat tape, subjecting said bar with its wrappings of material to a temperature corresponding to a temperature where maximum shrinkage is obtainable in said post-oriented polyethylene terephthalate, and removing said polyethylene terephthalate from said bar upon cooling.

2. The process of insulating an electrical conductor comprising applying a first coating of irradiated polyethylene to a bar of conductive material, adding an overlay of post-oriented polyethylene terephthalate on said irradiated polyethylene, heating said bar with its coatings at a temperature greater than 25° C. to effect shrinkage of said polyethylene terephthalate to thereby obtain a smooth, air-free covering of irradiated polyethylene on said conductor.

3. The process of insulating an electrical conductor comprising the steps of applying a first wrap of electrical insulating material on a bar conductor having at least one flat side, positioning a mating flat side of a semi-elliptical member in contact with the flat side of the insulated conductor, wrapping an overlayer of post-oriented polyethylene terephthalate over said insulating material and said semi-elliptical member, subjecting said bar with the materials wrapped thereon to a temperature between 25° C. and 150° C. to obtain shrinkage of said polyethylene terephthalate in a uni-axial direction with consequent application of pressure to the semi-elliptical member and said insulating material therebeneath thereby to provide a smooth air-free layer of insulation on said conductor, and removing said layer of polyethylene terephthalate.

4. The process of insulating an electrical conductor comprising the steps of applying a first layer of irradiated polyethylene on a bar of conductive material, applying an overlayer of post-oriented polyethylene terephthalate on said irradiated polyethylene, heating said bar with its insulating layers at a temperature greater than 25° C. to obtain shrinkage of the polyethylene terephthalate in a uni-axial direction and in an amount corresponding to the degree of post-orientation imparted thereto for providing a smooth air-free covering of insulation of said conductor.

5. The process of encapsulating an object by utilizing the tensile recovery force inherent in post-oriented polyethylene terephthalate comprising the steps of applying a first layer of material on said object, applying a second layer comprising post-oriented polyethylene terephthalate over said first layer, heating said object with its encapsulating layers at a temperature between 25° C. and 150° C. for a period of time sufficient to secure a degree of shrinkage of said polyethylene terephthalate in a uni-axial direction corresponding to the degree of post-orientation initially imparted thereto, and thereafter removing said polyethylene terephthalate.

6. The process according to claim 5 wherein said degree of shrinkage is within a range of 3% to 24%.

References Cited in the file of this patent

UNITED STATES PATENTS

| 2,304,210 | Scott et al. | Dec. 8, 1942 |
| 2,556,295 | Pace | June 12, 1951 |
| 2,578,899 | Pace | Dec. 18, 1951 |
| 2,606,134 | Sanders | Aug. 5, 1952 |
| 2,735,970 | Peck et al. | Feb. 21, 1956 |
| 2,836,744 | Clawson | May 27, 1958 |

FOREIGN PATENTS

| 606,752 | Great Britain | Aug. 19, 1948 |

OTHER REFERENCES

Papers of the American Association for Textile Technology, Inc.; Lanning, The General Properties of "Mylar" Polyester Film, March 1954, pages 76–79.